Nov. 13, 1923.
G. H. LEWIS
1,473,822
DEVICE FOR EXPANDING ENDLESS BANDS
Filed Jan. 8, 1921
2 Sheets-Sheet 1
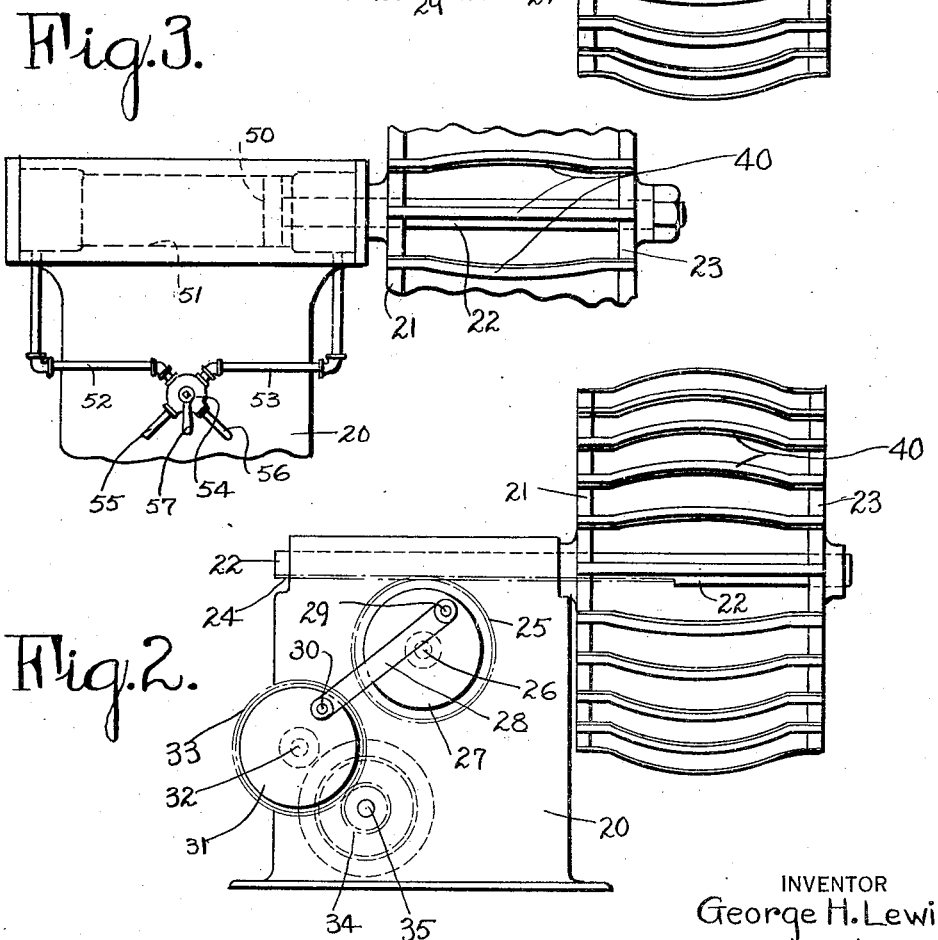

Nov. 13, 1923.                                                      1,473,822
G. H. LEWIS
DEVICE FOR EXPANDING ENDLESS BANDS
Filed Jan. 8, 1921                              2 Sheets-Sheet 2
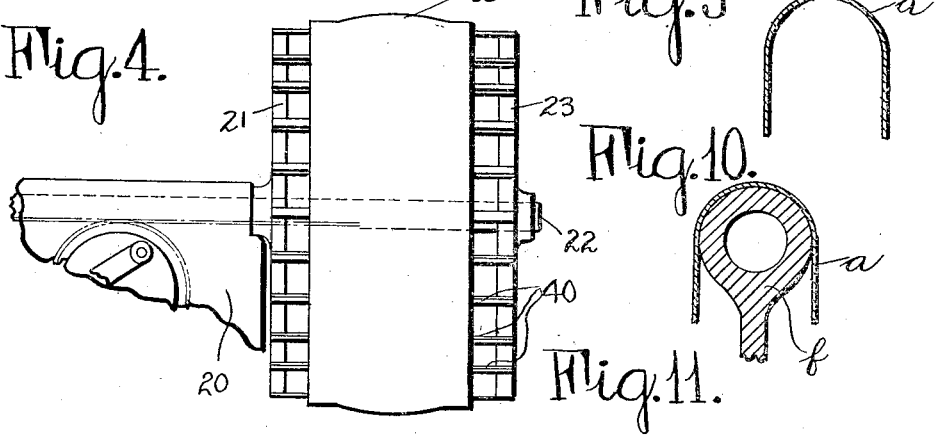
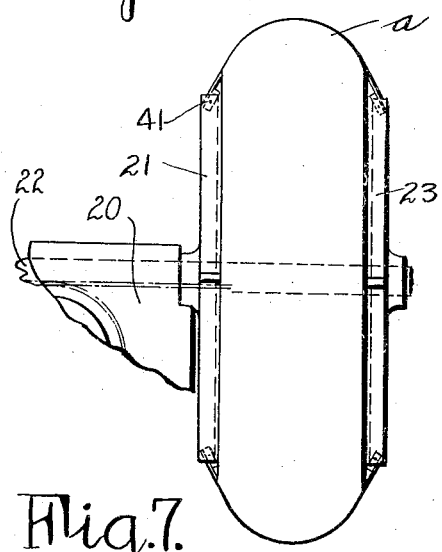
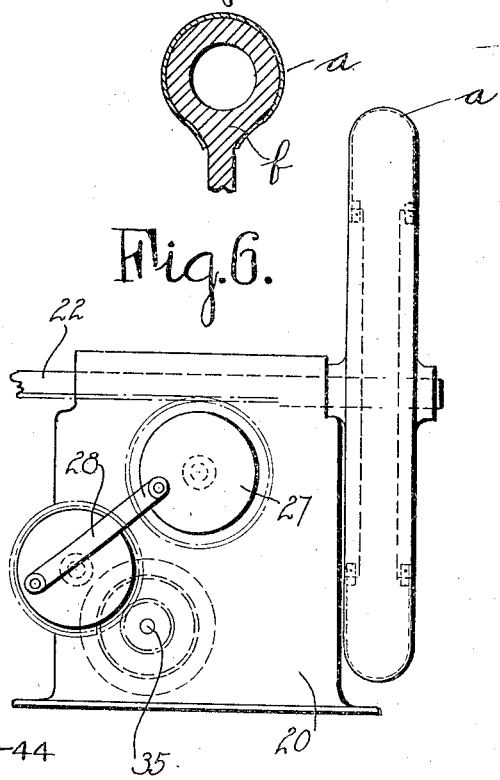
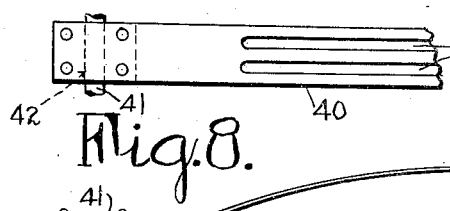
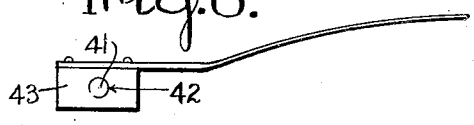
INVENTOR
George H. Lewis.
BY
Edward C. Taylor
ATTORNEY Patented Nov. 13, 1923.

1,473,822

UNITED STATES PATENT OFFICE.

GEORGE H. LEWIS, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

DEVICE FOR EXPANDING ENDLESS BANDS.

Application filed January 8, 1921. Serial No. 435,838.

*To all whom it may concern:*

Be it known that I, GEORGE H. LEWIS, a citizen of the United States of America, residing at Chicopee Falls, in the county of Hampden and State of Massachusetts, have invented certain new and useful Improvements in a Device for Expanding Endless Bands, of which the following is a specification.

This invention relates to improved devices for expanding endless bands in such a manner that the central portion of the band receives a uniformly greater stretch than the edge portions, and particularly relates to such devices for stretching endless bands as are used in forming the laminated portions of tire casings. It has for its object a device of this character which will operate economically and quickly, and which will give such bands the desired even expansion preparatory to their being placed on building cores or formers. Bands of endless tire building material have heretofore been shaped by the use of an air tube. This invention is directed to an apparatus for carrying out the operations in a more economical and expeditious way.

My invention will now be described in connection with the accompanying drawings in which:

Fig. 1 is a plan view of one form of the device;

Fig. 2 is an elevation thereof;

Fig. 3 is a partial elevation of a modification;

Fig. 4 is a view similar to Fig. 2 showing the initial step of expanding the band;

Fig. 5 is a view similar to Fig. 4 showing the band partially expanded, the expanding fingers being omitted except at the edge and bottom in the benefit of greater clearness;

Fig. 6 is a similar view showing the band fully expanded;

Figs. 7 and 8 are details of the expanding fingers;

Fig. 9 is a cross section of the expanded band;

Fig. 10 is a section of a core with such a band placed thereon; and

Fig. 11 is a view similar to Fig. 10 showing a band placed in its final relation to the core.

Referring first to the form of the device shown in Figs. 1, 2, and 4 to 8, a frame 20 carries a circular head 21. Coaxial with head 21 is a shaft 22 carrying a similar head 23. On the end of shaft 22 remote from the head 23 is a rack 24 meshing with a gear 25 carried by a shaft 26. This shaft carries a crank disk 27 to which a connecting rod 28 is pivoted by a pin 29. The other end of this connecting rod is pivoted by a pin 30 to a second crank disk 31 on a shaft 32 carrying a gear 33. This gear meshes with a pinion 34 on a shaft 35 which may be driven in either direction by any suitable mechanism. In Fig. 1 this has been conventionally shown by belt pulleys 36 and 37 which may be driven in opposite directions and either of which may be connected by a suitable clutch 38 to the shaft 35, a handle 39 serving to operate the clutch. Extending between heads 21 and 23 are a plurality of flexible expanding members or springs 40, secured thereto in any suitable way but preferably, as shown in Figs. 5 to 8, pivoted by pins 41 passing through holes 42 in blocks 43 attached to the end of the spring. These springs are preferably normally bent outwardly as shown in Figs. 1, 2, and 8 so that when the heads 21 and 23 are brought nearer together the springs will be bent outwardly into substantially the positions of Figs. 5 and 6. In order to reduce friction the springs may have grooves 44 in their outer surface thus restricting the area which comes in contact with the endless band to be expanded. Preferably also, the springs are made thicker at their ends than in the middle so that the bending of the springs will be largely confined to their central portions.

Turning now to Fig. 3, which shows a slight modification of the means for operating the movable head 23, corresponding parts to those previously described are denoted by the same numerals. Instead of the rack and gear mechanism which served in the first type described to operate shaft 22, in the modification shown as in Fig. 3 shaft 22 carries a piston 50 running in a cylinder 51 formed in frame 20. Pipes 52 and 53 lead to opposite ends of this cylinder from a valve 54 by means of which either end of the cylinder may be connected to a source of pressure 55 and the opposite end to an exhaust 56. By operating valve handle 57 the heads 21 and 23 may be reciprocated towards or away from each other and the springs 40 accordingly caused to bend.

Although the operation of this device should be apparent from the above description, it will now be briefly summarized in particular relation to Figs. 4, 5, 6, 9, 10, and 11. In Fig. 4 the band a, preferably formed of a double thickness of rubberized fabric or cord, is mounted centrally of the fingers by the operator. The heads 21 and 23 are then caused to approach each other causing the band to be stretched from the position of Fig. 5 into the form illustrated by Figs. 6 and 9, in which it will be noted that the central portion is considerably stretched while the edges remain substantially unstretched. The purpose of this will be apparent from a consideration of Figs. 10 and 11. It is well known to those familiar with the art of building tire casings that in one type of building operation endless bands are formed which are pulled over a core and stretched or rolled down the side of the core. Such a core is annular in form and shaped in cross section as shown at b in Figs. 10 and 11. If the band is stretched according to my present invention it will fit substantially the outer contour of this core, the outer periphery being lengthened to correspond to that of the core, while the edges of the band conform to the lesser circumference of the sides of the core. Therefore, after the band is applied to the core all that needs to be done is to fit the edges of the fabric to the lower side portion of the core as shown in Fig. 11.

Having thus described my invention, I claim:

1. An expansible and contractible former for use in tire building comprising opposed heads, a plurality of separate members connected between said heads, and means for causing said heads to move toward or away from each other whereby said members are caused to bend.

2. A device as claimed in claim 1 in which the members are pivotally mounted.

3. A device of the class described comprising opposed heads, means for moving said heads toward or away from each other, and flexible members pivoted at their ends to said heads, said members being less flexible adjacent their pivot points than in their immediate portions.

4. A device of the class described comprising a pair of heads, means for moving said heads toward or away from each other, and a complete circular series of flexible members connected between said heads substantially as and for the purpose specified.

5. A device of the class described comprising opposed circular heads, means for moving said heads toward and away from each other, and a circumferential series of flexible members pivoted at their ends to said heads, said members being normally curved outwardly to a slight extent at their central portion.

6. A device of the class described comprising opposed circular heads, means for moving said heads toward and away from each other, and a circumferential series of flexible members pivoted at their ends to said heads, said members being provided with grooves in their outer surfaces.

7. A device of the class described comprising a relatively fixed head, a shaft passing through said head, means to reciprocate said shaft, a second head carried by said shaft, and a circumferential series of flexible members pivotally mounted at their ends on said head.

8. An apparatus to shape a flat band of tire building material to approximate tire shape, comprising a cylindrical spring metal support for the band, and means to hold and guide the end edges of said metal support so that the latter will expand to approximate tire shape when the edges are brought together.

GEORGE H. LEWIS.